United States Patent
Gerber et al.

(10) Patent No.: US 8,312,141 B2
(45) Date of Patent: *Nov. 13, 2012

(54) NETWORK AWARE FORWARD CACHING

(75) Inventors: Alexandre Gerber, Madison, NJ (US);
Oliver Spatscheck, Randolph, NJ (US);
Dan Pei, Jersey City, NJ (US);
Mohammad Taghi Hajiaghayi,
Florham Park, NJ (US); Jeffrey Erman,
Morristown, NJ (US)

(73) Assignee: AT&T Intellectual Property I, LP,
Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/333,515

(22) Filed: Dec. 21, 2011

(65) Prior Publication Data

US 2012/0096140 A1    Apr. 19, 2012

Related U.S. Application Data

(63) Continuation of application No. 12/423,515, filed on Apr. 14, 2009, now Pat. No. 8,103,768.

(51) Int. Cl.
*G06F 15/173* (2006.01)

(52) U.S. Cl. ........ 709/225; 709/217; 709/218; 709/219; 709/231; 709/232; 709/233; 709/234; 709/235; 709/236; 709/250

(58) Field of Classification Search .......... 709/217–219, 709/225, 231–236, 250

See application file for complete search history.

(56) References Cited

U.S. PATENT DOCUMENTS

| | | | | | |
|---|---|---|---|---|---|
| 6,141,333 | A | * | 10/2000 | Chavez, Jr. | 370/338 |
| 6,434,609 | B1 | * | 8/2002 | Humphrey | 709/218 |
| 6,553,376 | B1 | * | 4/2003 | Lewis et al. | 1/1 |
| 2002/0032772 | A1 | * | 3/2002 | Olstad et al. | 709/224 |
| 2007/0248085 | A1 | * | 10/2007 | Volpano | 370/389 |
| 2010/0071012 | A1 | * | 3/2010 | Sofman et al. | 725/109 |
| 2011/0099332 | A1 | * | 4/2011 | Sofman et al. | 711/118 |

\* cited by examiner

*Primary Examiner* — Liangche A Wang
*Assistant Examiner* — Cheikh Ndiaye
(74) *Attorney, Agent, or Firm* — Larson Newman, LLP

(57) ABSTRACT

A network includes a cache server and a network aware server that operates to determine an optimization between a cost of retrieving content from a communication network and a cost of caching content at the cache server. The optimization is determined as a minimum of a sum of a transit cost, a backbone cost, and a caching cost. The transit cost includes a money cost per data unit. The backbone cost includes a money cost per data unit and time unit. The caching cost includes a money cost per server unit. In response to determining the optimization, the network aware server sends a content identifier to the cache server, and the cache server receives the content identifier, determines a source of a content item, and if the source is the same as the content identifier, then cache the content item.

20 Claims, 4 Drawing Sheets

NETWORK AWARE FORWARD CACHING

CROSS REFERENCE TO RELATED APPLICATIONS

This application is a continuation of U.S. patent application Ser. No. 12/423,515, entitled "Network Aware Forward Caching," filed on Apr. 14, 2009, the disclosure of which is hereby expressly incorporated by reference in its entirety.

FIELD OF THE DISCLOSURE

The present disclosure generally relates to communications networks, and more particularly relates to systems and methods for network aware content caching.

BACKGROUND

Communications networks carry Internet content and other data between content providers and end users. As the amount of Internet content and data carried by the communications network traffic increases, the amount of time an end user has to wait for content can also increase. In order to improve end user satisfaction, content providers may choose to serve their content from a content delivery network (CDN) that may mirrors the content at locations closer to the end users. Additionally, an Internet service provider (ISP) may choose to cache content.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Internet content can be forward cached at a point of presence (POP) in an Internet service provider (ISP). An ISP can make a POP network aware by determining a backbone cost, a transit cost, and a caching cost for content delivered from each network location to that POP. By minimizing the total cost of caching at each particular POP, the ISP can cost effectively cache content at the POP level to improve the customer experience and reduce the operating cost of the ISP's network.

Figure 1:
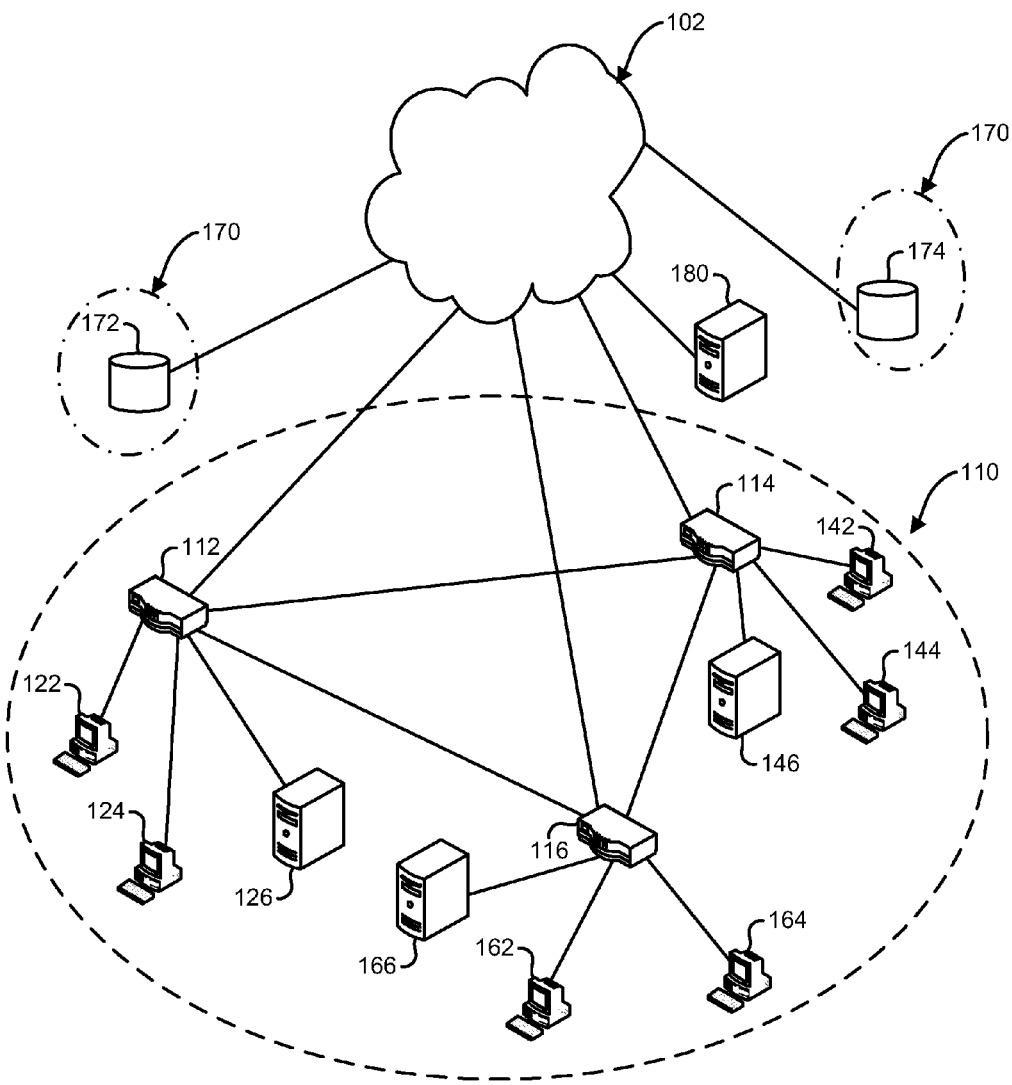
FIG. 1 is a block diagram illustrating a communications network in accordance with one embodiment of the present disclosure.

FIG. 1 shows a communication network 100. Communication network 100 includes an ISP 110, a content distribution network (CDN) 170, and a content server 108 that are connected together through a network 102, such as the Internet. ISP 110 includes POPs 112, 114, and 116 that communicate with each other. ISP 110 connects to network 102 through POPs 112, 114, and 116, permitting ISP 110 to connect to other ISP and autonomous networks (ANs) (not illustrated) in communication network 100, and otherwise gain access to resources and content on communication network 100. ISP 110 also includes client systems 122, 124, 142, 144, 162, and 164 and cache servers 126, 146, and 166.

Client systems 122 and 124, and cache server 126 are connected to POP 112. Client systems 142 and 144, and cache server 146 are connected to POP 114. Client system 162 and 164, and cache server 166 are connected to POP 116. Client systems 122, 124, 142, 144, 162, and 164 gain access to resources and content on communication network 100 through their respective POPs 112, 114, and 116. As such, POP 112 provides ingress and egress to communication network 100 for client systems 122 and 124, POP 114 provides ingress and egress for client systems 142 and 144, and POP 116 provides ingress and egress for client systems 162 and 164. A non-limiting example of a client system 122, 124, 142, 144, 162, and 164 includes a personal computer, a laptop computer, a set-top box, a handheld computing device, another general purpose computing system, or a combination thereof. In a particular embodiment (not illustrated), one or more of POPs 112, 114, and 116 are not connected directly to network 102. For example, POP 116 may not be connected directly to network 102. Here client systems 162 and 164 obtain ingress and egress to communication network 100 through POP 116, and either POP 112 or 114, depending upon routing conditions in ISP 110.

CDN 170 includes edge servers 172 and 174. CDN 170 is a distributed network, with edge servers 172 and 174 situated at different locations in communication network 100. For example, edge server 172 can be located in New Jersey, and edge server 174 can be located in Chicago. CDN 170 connects to network 102 through peering points at edge servers 172 and 174. With respect to communication network 100, the closest edge server may be the edge server having a shortest network distance, a lowest network cost, a lowest network latency, a highest link capacity, another measure of proximity on a network, or any combination thereof. As such, the distance between an edge server and a client system may be different from the geographic distance. In another embodiment (not illustrated), it is possible to locate edge servers 172 and 174 within ISP 110. While not shown to scale, FIG. 1 represents POP 112 as being in proximity to edge server 172, POP 114 as being in proximity to edge server 174 and to content server 180, and POP 116 as being more remote from edge servers 172 and 174 and from content server 180. For example, POP 112 may be located in New York City, POP 114 and content server 180 may be located in Chicago, and POP 116 may be located in El Paso.

Client systems 122, 124, 142, 144, 162, and 164 can retrieve information from communication network 100. For example, client systems 122, 124, 142, 144, 162, and 164 can retrieve content such as graphic, audio, and video content, and program files from CDN 170, and can retrieve a content provider's webpage, where the web page content resides on content server 180. Additionally, ISP 110 can cache certain content in cache servers 126, 146, and 166, in order to reduce the time it takes for a particular client system 122, 124, 142, 144, 162, or 164 to receive requested content. ISP 110 makes a determination of what content to cache at each client server 126, 146, and 166, based on the distance of a particular POP 112, 114, or 116 from the retrieved content, the type of content requested, the popularity of the content, and the network costs associated with retrieving the content. For example, because of the remoteness of POP 116, it may be desirable for ISP 110 to cache content from CDN 170 and from content server 180 at cache server 164. However, because POP 112 is close to edge server 172, it may not be desirable for ISP 110 to cache content from CDN 170, but it may still be desirable to cache content from content server 180 at cache server 126. Similarly, because POP 114 is close to both edge server 174 and to content server 180, it may not be desirable for ISP 110 to cache content from either edge server 174 or content server 180 at cache server 146.

In a particular embodiment, an ISP includes a set of POPs, $P=\{1, 2, 3, \ldots\}$ (e.g., POPs 112, 114, and 116). The distance between POPs is given as $l=(l_{i,j})$, where i, j∈P. Content is retrieved from a set of Internet protocol (IP) addresses $S=\{1, 2, 3, \ldots\}$. The monthly traffic volume from an address s that enters the ISP at an ingress point i and leaves the ISP at an egress point j, is given as $V=(v_{i,j,s})$. The monthly transit cost per unit volume for address s is given as $T=(t_s)$, where $t_s>0$ for provider traffic, $t_s<0$ for customer traffic, and $t_s=0$ for peer traffic.

In analyzing the cost of deploying forward caches at the POPs in the ISP, the ISP is constrained by a budget of N dollars. In particular, a cache server costs γ dollars, has a disk space of b Gigabytes (GB), and can handle a traffic throughput of e Megabits per second (Mbps). A boolean variable $C=(c_{i,s})$ defines the cacheability of content s at POP i, such that, if the content s is cacheable at POP i, then $c_{i,s}=1$, and if the content s is not cacheable at POP i, then $c_{i,s}=0$. The monthly traffic from s with ingress at POPj and egress at POP i that cannot be retrieved even from a cache at s is given as $U=(u_{i,j,s})$. The disk space at POP i needed to cache content from s is given as $X=(x_{i,s})$. Note that X differs from U in that particular content may need to be downloaded more than once, as, for example, when the content's life in the cache has expired, and thus the content contributes to U as the number of times the content is downloaded, but only contributes to X as the size x of the content.

In caching content, the ISP incurs a backbone cost (BC), a transit cost (TC), and a total up front caching cost (CC). BC is based upon the sum of the cost of delivery of content within the ISP. The unit of BC is given as α in dollars per mile-byte. Each particular traffic volume $v_{i,j,s}$ contributes to BC in an amount equal to:

$$v_{i,j,s} = \alpha \cdot l_{i,j} \cdot u_{i,j,s} \qquad \text{Equation 1}$$

when the content at s is cached at i (i.e., when $c_{i,s}=1$), and:

$$v_{i,j,s} = \alpha \cdot l_{i,j} \cdot v_{i,j,s} \qquad \text{Equation 2}$$

when the content at s is not cached at i (i.e., when $c_{i,s}=0$). Thus BC is given as:

$$BC = \alpha \sum_{\forall i \in P, j \in P, s \in S} l_{i,j} \cdot (v_{i,j,s} \cdot (1 - c_{i,s}) + u_{i,j,s} \cdot c_{i,s}) \qquad \text{Equation 3}$$

TC is based upon the sum of the cost of delivery over the network. The unit of TC is given as β in dollars per byte, and TC is given as:

$$TC = \beta \sum_{\forall i \in P, j \in P, s \in S} t_s \cdot (v_{i,j,s} \cdot (1 - c_{i,s}) + u_{i,j,s} \cdot c_{i,s}). \qquad \text{Equation 4}$$

CC is cost based upon the number of cache servers used at each POP. The traffic volume at POP i is $v_{j,s}$:

$$v_{j,s} = \sum_{\forall j \in P, s \in S} c_{i,s} \cdot v_{i,j,s}. \qquad \text{Equation 5}$$

Thus, the number of cache servers at POP i is given in terms of computing power as:

$$\frac{\sum_{\forall j \in P, s \in S} c_{i,s} \cdot v_{i,j,s}}{e} \qquad \text{Equation 6}$$

and the number of cache servers at POP i is given in terms of disk space as:

$$\frac{\sum_{\forall j \in P, s \in S} c_{i,s} \cdot v_{i,j,s}}{b} \qquad \text{Equation 7}$$

The upfront caching cost at POP i is the maximum between the number of cache servers needed in terms of computing power and the number of cache servers needed in terms of disk space. Thus, CC is given as:

$$CC = \gamma \cdot \sum_{\forall i \in P} \left[ \max \left( \sum_{\forall j \in P, s \in S} c_{i,s} \cdot v_{i,j,s}/e, \sum_{\forall j \in P, s \in S} c_{i,s} \cdot v_{i,j,s}/b \right) \right]. \qquad \text{Equation 8}$$

The problem of determining which content to cache at each POP is thus stated as finding $c_{i,s}$ such that the total cost (i.e., BC+TC+CC) is minimized and where the total upfront caching cost is less than the caching budget (i.e., CC≦N), or, after refactoring:

$$TotalCost = \min \left[ \sum_{\forall i \in P, j \in P, s \in S} v_{i,j,s} \cdot (\alpha \cdot l_{i,j} + \beta \cdot t_s) - \right. \\ \sum_{\forall i \in P, s \in S} c_{i,s} \cdot \sum_{\forall j \in P} (v_{i,j,s} - u_{i,j,s}) \cdot (\alpha \cdot l_{i,j} + \beta \cdot t_s) - \\ \left. \gamma \cdot \sum_{\forall i \in P} \left[ \max \left( \sum_{\forall j \in P, s \in S} c_{i,s} \cdot v_{i,j,s}/e, \sum_{\forall j \in P, s \in S} c_{i,s} \cdot v_{i,j,s}/b \right) \right] \right] \qquad \text{Equation 9}$$

Define $B_{i,s}$ as the benefit of caching s at i, excluding upfront costs as:

$$B_{i,s} = \sum_{\forall j \in P} (v_{i,j,s} - u_{i,j,s}) \cdot (\alpha \cdot l_{i,j} + \beta \cdot t_s) \quad \text{Equation 10}$$

then the object function becomes:

$$\text{maximize: } \sum_{\forall i \in P, s \in S} c_{i,s} \cdot B_{i,s} - \quad \text{Equation 11}$$

$$\gamma \cdot \sum_{\forall i \in P} \left[ \max \left( \sum_{\forall j \in P, s \in S} c_{i,s} \cdot v_{i,j,s} / e, \sum_{\forall j \in P, s \in S} c_{i,s} \cdot v_{i,j,s} / b \right) \right]$$

subject to:

$$\sum_{\forall i \in P} \left[ \max \left( \sum_{\forall j \in P, s \in S} c_{i,s} \cdot v_{i,j,s} / e, \sum_{\forall j \in P, s \in S} c_{i,s} \cdot v_{i,j,s} / b \right) \right] \leq \quad \text{Equation 12}$$

$$N / \gamma = N'.$$

In a particular embodiment, the solutions to Equations 11 and 12 are found through a pseudo-polynomial-time dynamic programming algorithm. Considering a particular POP i and content s, the need for computational power is denoted as $C_s$:

$$C_s = \sum_{\forall j \in P} v_{i,j,s} \quad \text{Equation 13}$$

and the need for disk space is denoted as $M_s$:

$$M_s = x_{i,s}. \quad \text{Equation 14}$$

A table T[s, C, M] is filled that determines the maximum benefit that is obtained from content S with at most C computational power and M total disk space where:

$$C/e \cdot M/b \leq N' \quad \text{Equation 15}$$

that is, the number of cache units affordable under the cache budget (i.e., N/γ). Set:

$$T[0,C,M]=0 \quad \text{Equation 16}$$

for all feasible values of C and M. For s>0:

$$T[s,C,M]=\max\{T[s-1,C,M], T[s-1,C-C_s, M-M_s]+B_{i,s}\} \quad \text{Equation 17}$$

where $C \geq C_s$ and $M \geq M_s$, and:

$$T[s,C,M]=\infty \quad \text{Equation 18}$$

where $C<C_s$ and $M<M_s$. The maximum benefit that can be obtained by caching content in POP i, with at most $0 \leq U \leq N'$ units of cache, as determined by the maximum computational power or the maximum disk space is given as $T'^i[U]$:

$$T'^i[U]=T[|S|, e \cdot U, b \cdot U] \quad \text{Equation 19}$$

The maximum benefit that can be obtained from all POPs 1–i with at most $0 \leq U \leq N'$ units of cache is give as T"[i, U]:

$$T''[0,U]=0 \quad \text{Equation 20}$$

for all affordable values of $0 \leq U \leq N'$, and:

$$T''[i,U]=\max_{0 \leq j \leq U}\{T''[i-1,U-j]+T'^i[j]\}. \quad \text{Equation 21}$$

Finally, the maximum of Equation 11, subject to Equation 12 is found as:

$$\max_{1 \leq U \leq N'}\{T''[|P|,U]-\gamma U\}. \quad \text{Equation 22}$$

In another embodiment, the solutions to Equations 11 and 12 are found through a polynomial-time 1–ϵ-approximation programming algorithm. A polynomial-time 1–ϵapproximation programming algorithm has a value at least 1–ϵ times the optimum value described above, based upon dynamic programming, for arbitrarily small values of ϵ<0.

In another embodiment, a greedy heuristic algorithm is used to find approximate solutions to Equations 11 and 12. Based upon the notion that the total number of cache servers n is within the range of [0, N'], Equations 11 and 12 can be approximated as:

$$\text{maximize: } \sum_{\forall i \in P, s \in S} c_{i,s} \cdot B_{i,s} - \lambda \cdot n \quad \text{Equation 23}$$

subject to $n \leq N'$. Note that, enumerating over all n, λ·n is a fixed cost that can be ignored for the purposes of determining the maximum in Equation 23. A weight of content s to be cached on POP i is given as $w_{i,s}$:

$$\sum_{\forall i \in P, s \in S} c_{i,s} \cdot B_{i,s} - \lambda \cdot n. \quad \text{Equation 24}$$

Thus, for a fixed n, the following algorithm can be used to choose the most cost-efficient (i, s) pair to cache first.
1: for n=0 to N', do
2: $c_{i,s}$=0 for all i and s//clear all $c_{i,s}$
3: for (i, s) pairs ranked by $B_{i,s}/w_{i,s}$ descendingly, do
4: $c_{i,s}$=1 as long as the total number of used caches so far is not more than n;
5: endfor
6: endfor
7: find the lowest (BC+TC+CC) across different n, and output the corresponding C=($c_{i,s}$)

In resolving Equation 11, subject to Equation 12, a determination of the cacheability of content from each IP address s at each POP i is made, and the determination is provided to the cache servers at each POP. In this way, the ISP provider reduces caching cost, improves network efficiency, and improves the end user experience. In a particular embodiment, a management server at ISP 110 (not illustrated) functions to determine the cacheability of content for cache servers 126, 146, and 166, by providing a list of cacheable IP addresses. In another embodiment, one of cache servers 126, 146, 166, or another server (not illustrated) can determine cacheability for ISP 110. Note that, as discussed above, single IP addresses are described and evaluated. However, in practice, IP address ranges can be evaluated, and lists of IP addresses can include IP address ranges.

Figure 2:
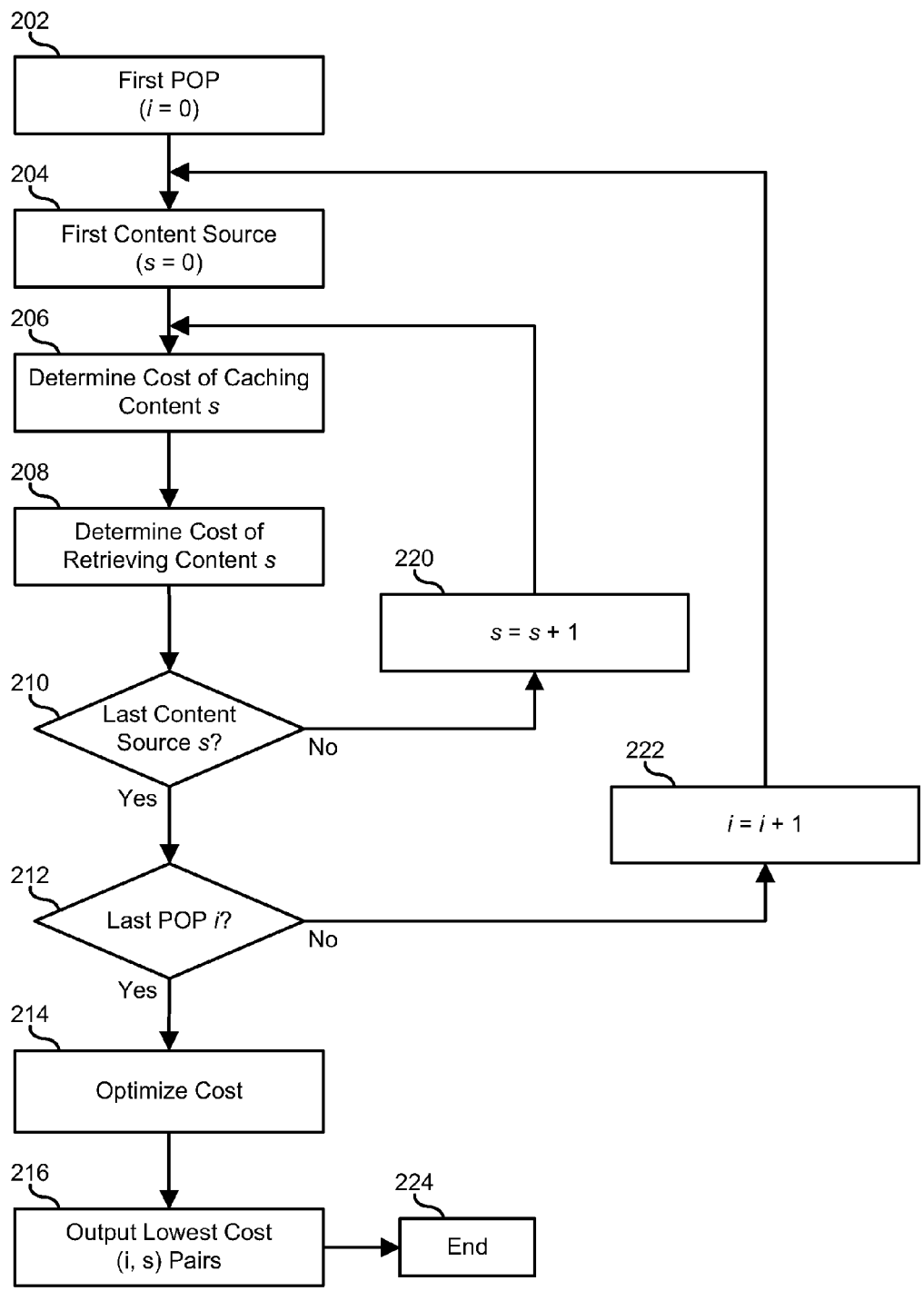
FIG. 2 is a flow diagram illustrating a method of determining content to cache at an Internet service provider in accordance with an embodiment of the present disclosure.

FIG. 2 shows a method of determining the content to cache at an Internet service provider in accordance with an embodiment of the present disclosure. The method starts in block 202, where a first POP (i=0) is evaluated. For example, evaluation can begin with POP 112. A content source s, such as content server 180, is selected in block 204. The cost of caching content from s at POP i is determined in block 206, and the cost of retrieving content from s at POP i is determined in block 208. A decision is made in decision block 210 as to whether or not the content source s is the last content source. If not, then the "NO" branch of decision block 201 is taken, the next content source is selected, that is, s=s+1, in block 220. For example, cache server 114 can be selected. Processing then returns to block 204, where the content source s is selected. If the content source s is the last content source, then the "YES" branch of decision block 210 is taken and the costs of caching content versus the cost of retrieving content are optimized in block 214. For example, the optimization can be performed by using a pseudo-polynomial-time dynamic programming algorithm, a polynomial-time 1–ϵ-approximation programming algorithm, or a greedy heuristic algorithm, as described above. The list of (i, s) pairs associated with the lowest cost is output to the cache servers in block 216, and processing ends in block 224.

Figure 3:
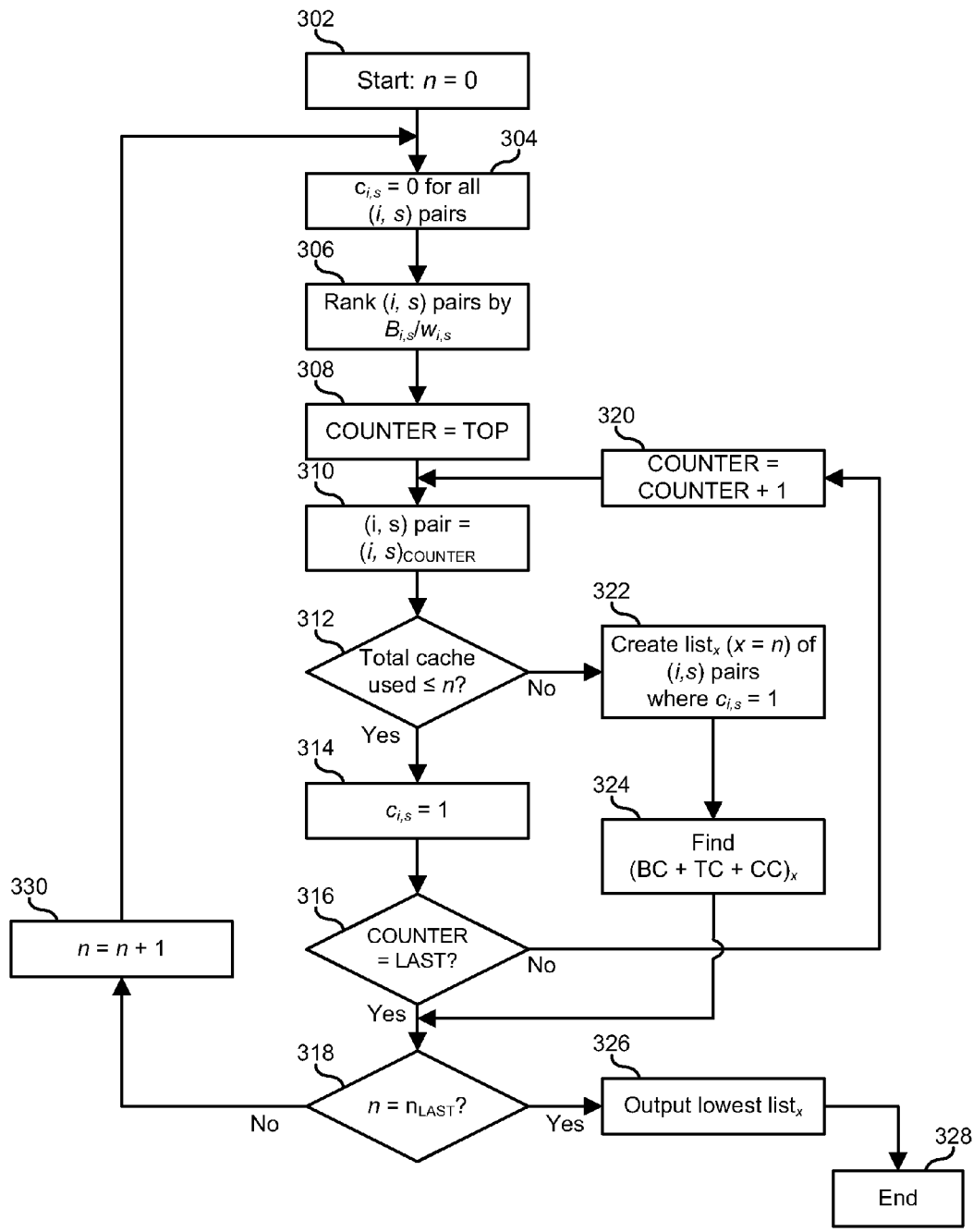
FIG. 3 is a flow diagram illustrating another method of determining content to cache at an Internet service provider in accordance with an embodiment of the present disclosure.

FIG. 3 shows a method of determining the content to cache at an Internet service provider in accordance with an embodiment of the present disclosure. The method starts in block 302, where a first cache server n=0 is considered. The cacheability of all (i, s) pairs $c_{i,s}$ is set to equal zero (0) in block 304. All (i, s) pairs are ranked by $B_{i,s}/w_{i,s}$ in block 306. An (i, s) pair counter (COUNTER) is set to the top (TOP) pair in block 308, and (i, s) pair $(i, s)_{COUNTER}$ is selected in block 310. A decision is made in decision block 312 as to whether or not the content of $(i, s)_{COUNTER}$ is cacheable within cache n. If so, then the "YES" branch of decision block 312 is taken and the cacheability of $(i, s)_{COUNTER}$ ($c_{i,s}$) is set to one (1) in block 314. A decision is made in decision block 316 as to whether or not the (i, s) pair counter is equal to the position of the last (i, s) pair (LAST) in the ranked list of (i, s) pairs. If not, then the "NO" branch of decision block 316 is taken, one (1) is added to the (i, s) pair counter, that is COUNTER=COUNTER+1, in block 320, and processing returns to block 310, where (i, s) pair $(i, s)_{COUNTER}$ is selected.

If the content of $(i, s)_{COUNTER}$ is not cacheable within cache n, then the "NO" branch of decision block 312 is taken, and a list$_x$, where x=n, is created that includes the (i, s) pairs that are cacheable, that is, for which $c_{i,s}=1$, in block 322. The total cost, consisting of the sum of the backbone cost (BC), the transit cost (TC), and the caching cost (CC), associated with caching the content of list$_x$ is determined in block 324. After the total cost associated with caching the content of list$_x$ is determined in block 324, or if, in decision block 316, the (i, s) pair counter is equal to the position of the last (i, s) pair (LAST) in the ranked list of (i, s) pairs, and the "YES" branch of decision block 316 is taken, then a decision is made in decision block 318 as to whether or not the cache server n being considered is the last cache server ($n_{LAST}$). If not, then one (1) is added to n, that is n=n+1, in block 330, and processing returns to block 304 where the cacheability of all (i, s) pairs $c_{i,s}$ is set to equal zero (0). If the cache server n being considered is the last cache server ($n_{LAST}$), then the "YES" branch of decision block 318 is taken, the list$_x$ of (i, s) pairs with the lowest cost is output to the cache servers in block 326, and processing ends in block 328.

Figure 4:
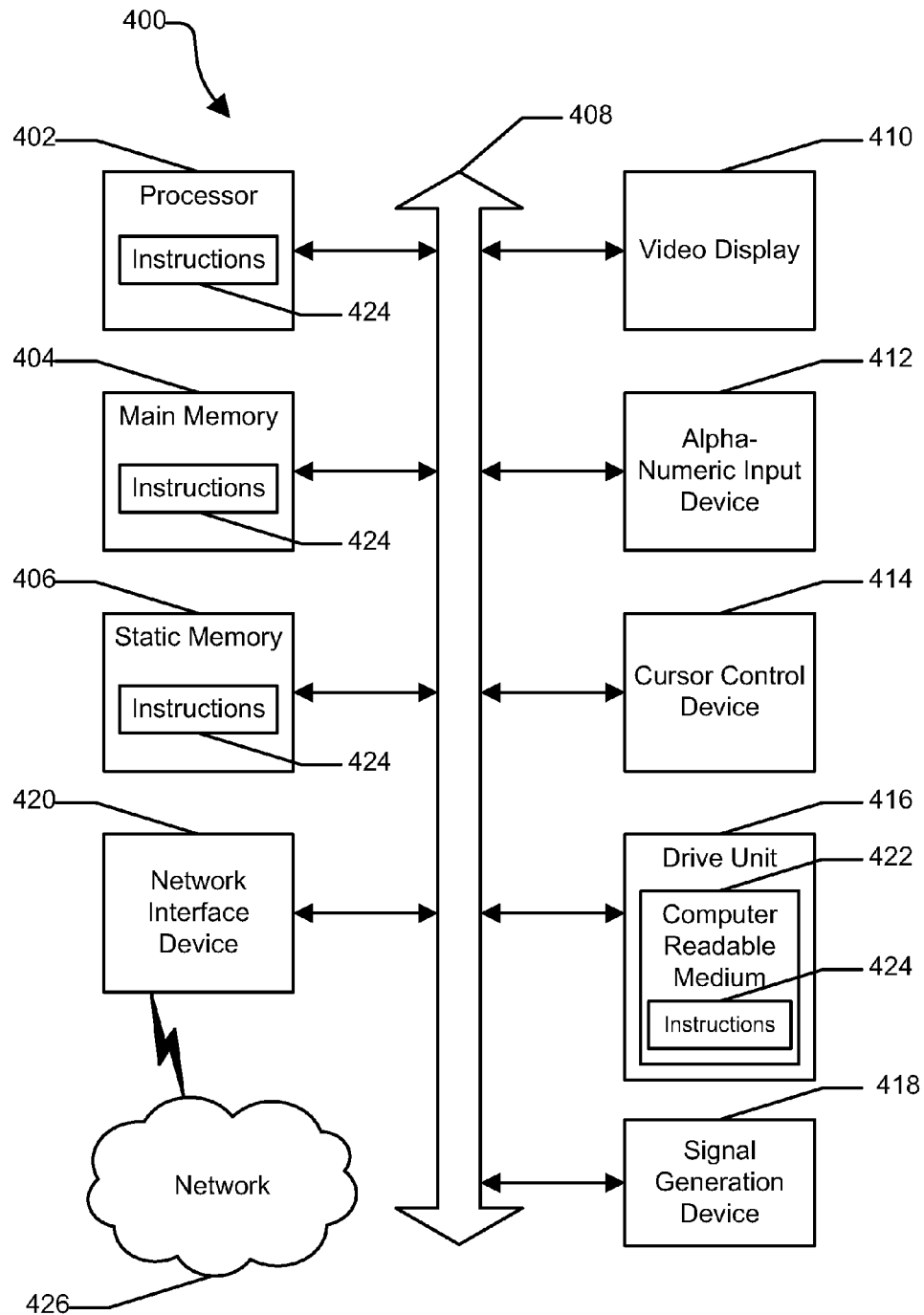
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a P2P (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid-state display, or a cathode ray tube (CRT). Additionally, the computer system 400 may include an input device 412 such as a keyboard, and a cursor control device 414 such as a mouse. Alternatively, input device 412 and cursor control device 414 can be combined in a touchpad or touch sensitive screen. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A network comprising:
a first cache server; and
a network aware server including a memory and a processor operable to execute code stored in the memory to perform a method including:
determining at the network an optimization between a cost of retrieving content from a communication network and a cost of caching content from the communication network at the first cache server, wherein the optimization is determined by finding a minimum of a sum of a transit cost, a backbone cost, and a caching cost, wherein;
the transit cost includes a money cost per data unit for the network;
the backbone cost includes a money cost per data unit and time unit for the network; and
the caching cost is defined as:

$$CC = \gamma \cdot \sum_{\forall i \in P} \left[ \max\left( \sum_{\forall j \in P, s \in S} c_{i,s} \cdot v_{i,j,s} / e, \sum_{\forall j \in P, s \in S} c_{i,s} \cdot v_{i,j,s} / b \right) \right]$$

where P is a set of points of presence, S is a set of source addresses, $\gamma$ is a cache server cost, v is a monthly traffic volume between i and j from s that is cacheable, c is a Boolean value associated with cacheability, e is a cache server throughput, and b is a cache server disk space; and
in response to determining the optimization, send a first content identifier to the first cache server;
wherein the first cache server is operable to:
receive the first content identifier:
determine a first source of a first content item; and
if the first source is the same as the first content identifier, then cache the first content item.

2. The network of claim 1, further comprising a second cache server, and wherein:
in further response to determining the optimization, the network aware server is operable to send a second content identifier to the second cache server; and
the second cache server is operable to:
receive the second content identifier:
determine a second source of a second content item; and
if the second source is the same as the second content identifier, then cache the second content item.

3. The network of claim 1, wherein the transit cost of retrieving content from the communication network includes:

an external transit cost that is associated with transporting content from the communication network to the network; and
an internal transit cost that is associated with transporting the content item from an ingress point of presence to an egress point of presence.

4. The network of claim 3, wherein the caching cost is further constrained by a maximum cache budget for the network.

5. The network of claim 1, wherein finding the minimum sum includes applying a pseudo-polynomial-time dynamic programming algorithm.

6. The network of claim 1, wherein finding the minimum sum includes:
applying a weight to a plurality of content items retrieved from the communication network;
ranking the plurality of content items by the weight;
determining whether an available cache volume is large enough to cache a first particular of the plurality of content items with a greatest weight; and
in response to determining that the available cache volume is large enough to cache the first particular of the plurality of content items, sending to a first particular of the plurality of points of presence a third content identifier associated with the first particular of the plurality of content items.

7. The network of claim 6, wherein finding the minimum sum further includes:
determining whether the available cache volume is large enough to cache a second particular of the plurality of content items with a next greatest weight; and
in response to determining that the available cache volume is large enough to cache the second particular of the plurality of content items, sending to the first particular of the plurality of points of presence a fourth content identifier associated with the second particular of the plurality of content items.

8. A method comprising:
determining in a network aware server an optimization between a cost of retrieving content from a network and a cost of caching content from the network at a plurality of points of presence, wherein the optimization is determined by finding a minimum of a sum of a transit cost, a backbone cost, and a caching cost, wherein:
the transit cost (TC) is defined as:

$$TC = \beta \sum_{\forall i \in P, j \in P, s \in S} t_s \cdot (v_{i,j,s} \cdot (1 - c_{i,s}) + u_{i,j,s} \cdot c_{i,s})$$

where P is a set of points of presence, S is a set of source addresses, $\beta$ is a unit of transit cost, t is a monthly cost per traffic volume, v is a monthly traffic volume between i and j from s that is cacheable, u is a monthly traffic volume between i and j from s that is uncacheable, and c is a Boolean value associated with cacheability;
the backbone cost includes a money cost per data unit and time unit for the network; and
the caching cost includes a money cost per server unit for the network;
in response to determining the optimization, sending to a first particular of the plurality of points of presence a first content identifier;
determining at the first particular point of presence a first source of a first content item; and if the first source is the same as the first content identifier, then caching the first content item at the first particular point of presence.

9. The method of claim 8, further comprising:
in response to determining the optimization, sending to a second particular of the plurality of points of presence a second content identifier;
determining at the second particular point of presence a second source of a second content item; and
if the second source is the same as the second content identifier, then caching the second content item at the second particular point of presence.

10. The method of claim 8, wherein the transit cost of retrieving content from the network includes:
an external cost that is associated with transporting content from the network to an Internet service provider; and
an internal cost that is associated with transporting the content item from an ingress point of presence to an egress point of presence.

11. The method of claim 10, wherein the cost of caching content is constrained by a maximum cache budget for the Internet service provider.

12. The method of claim 8, wherein finding the minimum sum includes applying a pseudo-polynomial-time dynamic programming algorithm.

13. The method of claim 8, wherein finding the minimum sum includes:
applying a weight to a plurality of content items retrieved from the network;
ranking the plurality of content items by the weight;
determining whether an available cache volume is large enough to cache a first particular of the plurality of content items with the greatest weight; and
in response to determining that the available cache volume is large enough to cache the first particular of the plurality of content items, sending to the first particular of the plurality of points of presence a third content identifier associated with the first particular of the plurality of content items.

14. The method of claim 13, wherein finding the minimum sum further includes:
determining whether the available cache volume is large enough to cache a second particular of the plurality of content items with the next greatest weight; and
in response to determining that the available cache volume is large enough to cache the second particular of the plurality of content items, sending to the first particular of the plurality of points of presence a fourth content identifier associated with the second particular of the plurality of content items.

15. A non-transitory computer readable medium including code for performing a method, the method comprising:
determining an optimization between a cost of retrieving content from a network and a cost of caching content from the network, wherein the optimization is determined by finding a minimum of a sum of a transit cost, a backbone cost, and a caching cost, wherein:
the transit cost includes a money cost per data unit for an Internet service provider network;
the backbone cost is defined as:

$$BC = \alpha \sum_{\forall i \in P, j \in P, s \in S} l_{i,j} \cdot (v_{i,j,s} \cdot (1 - c_{i,s}) + u_{i,j,s} \cdot c_{i,s})$$

where P is the set of points of presence, S is the set of source addresses, $\alpha$ is a unit of backbone cost, l is a distance between i and j, v is a monthly traffic volume between i and j from s that is cacheable, u is a monthly traffic volume between i and j from s that is uncacheable, and c is a Boolean value associated with cacheability; and
the caching cost includes a money cost per server unit for the Internet service provider network;
in response to determining the optimization, determining a first content identifier from which content is to be cached;
determining a first source of a first content item; and
if the first source is the same as the first content identifier, then caching the first content item.

16. The non-transitory computer readable medium of claim 15, wherein the transit cost of caching content is constrained by a maximum cache budget for an Internet service entity.

17. The non-transitory computer readable medium of claim 15, wherein finding the minimum sum includes:
applying a weight to a plurality of content items retrieved from the network;
ranking the plurality of content items by the weight;
determining whether an available cache volume is large enough to cache a first particular of the plurality of content items with a greatest weight; and
in response to determining that the available cache volume is large enough to cache the first particular of the plurality of content items, sending to a first particular of the plurality of points of presence a third content identifier associated with the first particular of the plurality of content items.

18. The network of claim 1, wherein finding the minimum sum includes applying a polynomial time approximation programming algorithm.

19. The network of claim 1, wherein finding the minimum sum includes applying a greedy heuristic programming algorithm.

20. The non-transitory computer readable medium of claim 15, wherein finding the minimum sum includes applying a pseudo-polynomial-time dynamic programming algorithm.

* * * * *